Jan. 27, 1959 T. G. BERGEY 2,870,990
DRILLING FLUID METHOD
Filed March 2, 1955
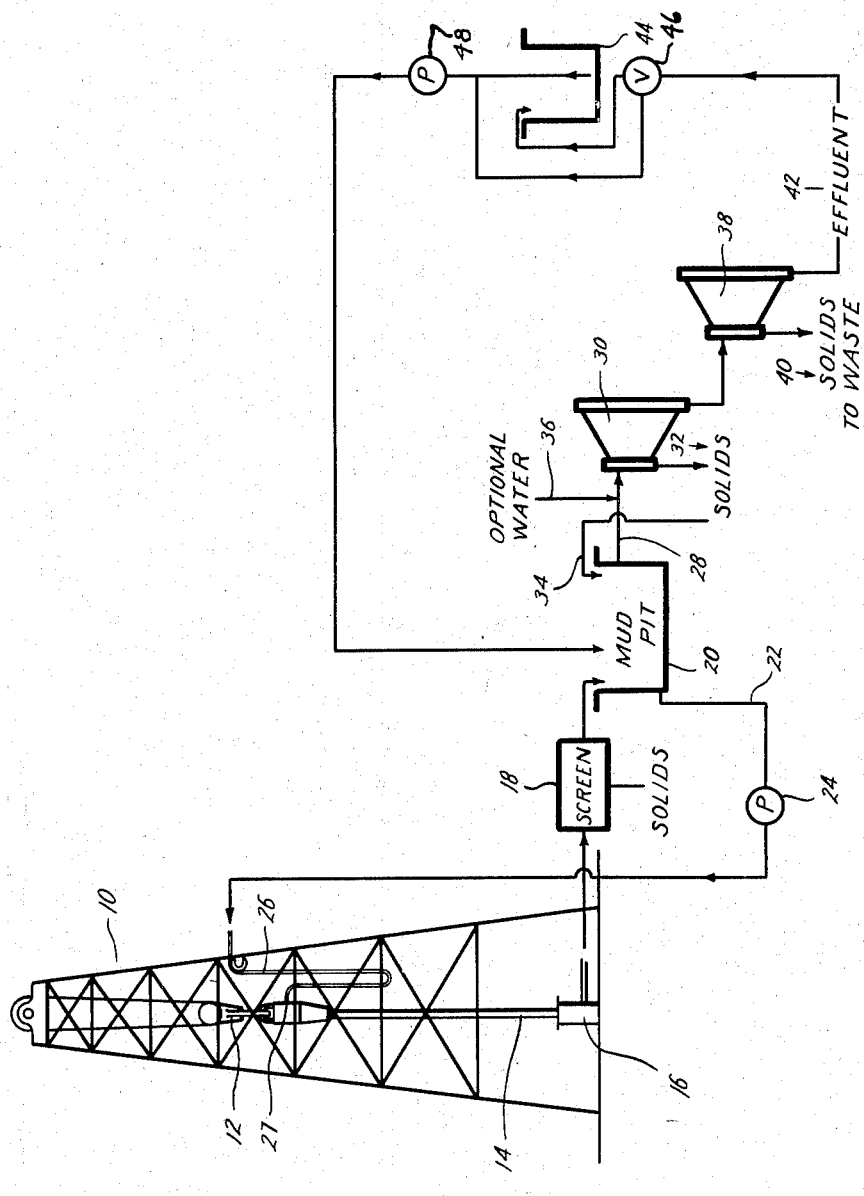
Taylor G. Bergey
INVENTOR.
BY James H. Weiler
Jefferson D. Giller
ATTORNEYS

United States Patent Office 2,870,990
Patented Jan. 27, 1959

---

2,870,990

DRILLING FLUID METHOD

Taylor G. Bergey, Houston, Tex.

Application March 2, 1955, Serial No. 491,748

9 Claims. (Cl. 255—1.8)

This invention relates to a method of treating oil, gas, and sulphur well drilling fluids to recover weighting materials used therein and to produce or recover an effluent or liquid which is suitable for reuse in the drilling fluids.

In the drilling of oil, gas, and sulphur wells, drilling fluids are used which are required to have certain properties so that they will cool and lubricate the bit and drill pipe, remove cuttings from the hole, deposit a thin impervious coating on the well bore and the like. In use it is a common practice to "weight" these drilling fluids by the addition of barite or other materials. During drilling, the bit at the lower end of the drill string cuts the formation through which it passes and these cuttings are carried to the surface by the drilling fluids. Such cuttings contain materials which often increase the gel strength and viscosity of drilling fluid above that which is desired and also add suspended material which is considerably lighter than the weighting material so that the weight of the drilling fluid is decreased.

Among various treatments that are applied to drilling fluids is the separation, such as by centrifuging, of the weighting material from the effluent which may be water and lighter weight suspended solids such as drill bit cuttings. These weighting materials are expensive and are normally returned to the circulation system and the effluent discarded. In making satisfactory drilling fluids, water which does not contain the suspended solids from the cuttings in the well is ordinarily used, although oil emulsion and oil-base muds are sometimes used. In arid regions and in offshore drilling operations, such as in the Gulf of Mexico, it is often difficult and very expensive to obtain a source of fresh water. In short, the supply of suitable liquid, such as fresh water, for use in making drilling fluids or muds is an exceedingly serious problem where it is not readily available. It would be highly advantageous to provide a method in which usable liquid could be recovered from the circulated drill mud to avoid or minimize the addition of additional liquid, such as water.

It is therefore a general object of the present invention to provide a method of treating drilling fluids in which weighting material in the drilling fluids is separated and recovered for further use in the drilling fluids and an effluent or liquid is produced and recovered which is suitable for reuse in the drilling fluids.

Another object of the present invention is to provide a method of treating drilling fluids in which the weighting material in such drilling fluids is substantially removed therefrom by separation and recovered for further treatment of the drilling fluids, such as by centrifuging, and the effluent from the first centrifuging is further centrifuged under such conditions that the resulting effluent or liquid may satisfactorily be reused in the drilling fluids.

A still further object of the present invention is to provide a method for treating the effluent normally discarded from the step of separating weighting materials from the drilling fluids, by centrifuging this effluent to remove the suspended solids therein to the extent that the resulting effluent or liquid may satisfactorily be reused in the drilling fluids.

And still another object of the present invention is to provide a method of treating oil well drilling fluids in which the weighting material has been at least partially removed by centrifuging sufficiently to separate from them a sufficient amount of suspended solids so that the remaining effluent or liquid is suitable for reuse in the drilling fluids.

Other objects, features and advantages will be apparent from the following description of the invention, given for the purpose of disclosure, and taken in conjunction with the accompanying drawing, in which The figure is a schematic diagram illustrating a method of recovering weighting material and liquid for reuse according to the invention.

Referring now to the drawing, the reference numeral 10 designates a conventional derrick having suspended from its top the usual traveling block 12 supporting the swivel 13, which in turn supports the kelly 14 which rotates the drill string (not shown) connected thereto in the well bore by means of a rotary table, also not shown. From the well head 16, drilling fluids debouching from the well normally pass through a screen 18, such as a vibrating screen, to remove many of the drill cuttings. From this screen the drill fluids then pass into a mud pit 20, shown here as a single pit although several pits or a tank may be used, such as in offshore operations, if desired. From the mud pit 20 the drilling fluids are returned to the well by means of the mud pipe 22, pump 24 and the flexible hose 26 to the mud connection 27 of the swivel 13. All of these elements are conventional and numerous such arrangements may be used including various pumps to assist the flow, such as suction pumps and the like. Accordingly, no detailed description thereof is deemed necessary.

As previously mentioned, the drilling fluids are sometimes centrifuged to separate the weighting material from the remainder of the fluid and this operation is shown diagrammatically in the attached drawing with the fluid flowing from mud pit 20 through line 28 to the first centrifuge 30 from which centrifuge the weighting materials or solids 32 are discharged and returned to mud pit 20 through line 34. Prior to this first centrifuging additional fresh water may be added through line 36, if desired.

The removal of weighting materials by centrifuging is old and well known in the art of drilling oil and gas wells and no further description thereof is deemed necessary.

The present invention is based upon the discovery that if the drilling fluid from which the weighting material has been at least partially removed, such as the effluent from the first centrifuge 30, is centrifuged by a centrifuge which creates a centrifugal force of at least approximately twenty-one hundred times the force of gravity, or 2100 × gravity as it is sometimes expressed, the effluent from such centrifuging will have removed from it a sufficient amount of the remaining suspended solids so that this effluent is suitable for reuse as a liquid in the drilling fluid. The effluent from the centrifuge developing at least approximately 2100 × gravity will have removed from it all suspended solids of larger size than approximately 2 microns in diameter and suspended solids of less than approximately 2 microns in diameter do not normally prevent further use of the effluent.

As shown diagrammatically in the attached drawing, the effluent from the first centrifuge 30 flows into the second centrifuge 38 which is adapted to separate the solids 40 by centrifuging at about 2100 × gravity or above from the final effluent 42. This final effluent 42 may pass to the tank 44 for storage or be returned directly to the mud pit as desired. A valve such as valve 46 permits this option of passing final effluent 42 to tank 44 or directly to mud pit 20 and one or more pumps such as at 48 may be used to assist this flow.

If batch operations are not objectionable, a single centrifuge may be used instead of two centrifuges in which case the centrifuge will first be run at the speed normally used to separate the weighting material from the remainder of the drilling fluid and thereafter the centrifuge will be operated at a speed sufficient to develop about 2100 × gravity or greater and the effluent from the first centrifuge returned back into the centrifuge.

Any centrifuge which will develop approximately 2100 × gravity or greater and which is constructed so that it will separate the solids deposited by this force from the remaining effluent is satisfactory. A scroll type centrifuge manufactured by The Sharples Corporation, 2300 Westmoreland Street, Philadelphia 40, Pennsylvania, known as the "Sharples Super-D-Canter" has been found quite satisfactory for such operations. Centrifuges which develop less than 2100 × gravity are not satisfactory as the final effluent contains a quantity of suspended solids of light weight and high gelling and viscosity properties which in most instances prevents reuse of the effluent as a liquid in drilling fluids.

The present invention is highly advantageous in that it permits reuse of the liquid in the drilling fluid in addition to recovering the expensive weighting materials. The problem of supplying liquid for drilling fluid purposes in arid regions and in offshore operations where liquid, such as fresh water, must be transported to the site is indeed a serious problem and adds considerably to the expense of drilling the well.

The present invention is therefore well suited to carry out the objects and attain the advantages and ends mentioned as well as others inherent therein.

It is understood that the principles of the invention can be applied to a variety of mud or drill fluid systems and that the schematic arrangement illustrated in the drawing is illustrative only. Accordingly, numerous changes in the method will readily suggest themselves to those skilled in the art in connection with various mud systems. Accordingly, the invention is to be limited only by the spirit thereof and the scope of the appended claims.

What is claimed is:

1. A method of treating oil, gas and sulphur well drilling fluid containing suspended solids and weighting material of greater density than the suspended solids to recover the weighting material and to produce an effluent suitable for reuse in drilling fluid comprising, separating at least partially the weighting material from the drilling fluid, centrifuging the remaining drilling fluid by a centrifugal force sufficient to separate enough suspended solids from the drilling fluid to produce an effluent which is suitable for use in the drilling fluid, and reinjecting the weighting material into the effluent.

2. A method of treating oil, gas and sulphur well drilling fluid containing suspended solids and weighting material of greater density than the suspended solids to recover weighting material therein and to produce an effluent which is suitable for reuse in treating drilling fluid comprising the steps of separating at least a portion of the weighting material from the drilling fluid, centrifuging the remaining drilling fluid at at least approximately 2100 × gravity, recovering the effluent from such centrifuging, and reinjecting the weighting material into the effluent.

3. The method of claim 2 in which the weighting materials are at least partially separated from the drilling fluids by centrifuging.

4. In the method of separating solids from liquid in an oil, gas, and sulphur well drilling fluid wherein weighting material has been at least partially removed from the drilling fluid leaving an effluent of lighter specific gravity than the original drilling fluid and containing suspended solids, the improvement comprising centrifuging the effluent at at least about 2100 × gravity, recovering the effluent from such centrifuging, and returning the effluent to the weighting material.

5. A method of producing an effluent from an oil, gas, and sulphur well drilling fluid having suspended solids therein after weighting materials of greater density than the suspended solids in such drilling fluid have been at least partially separated from it, comprising centrifuging the drilling fluid at at least approximately 2100 × gravity, recovering the effluent from such centrifuging, and returning the effluent to the weighting material.

6. The method of claim 5 wherein the separation of the weighting material is at least in part by centrifuging.

7. In a method of treating an oil, gas, and sulphur well drilling fluid containing suspended solids after weighting materials of greater density than suspended solids in such drilling fluids have been partially separated from it, the improvement comprising, centrifuging the drilling fluid by applying a centrifugal force reacting against such suspended solids in such drilling fluid sufficient to separate from such drilling fluid a sufficient amount of such suspended solids to produce an effluent that is suitable for re-use in the drilling fluids, and re-using the effluent in treatment of drilling fluid.

8. The method of claim 7 in which the centrifuging is continued until all solids larger than approximately 2 microns in diameter are removed from the effluent.

9. A method of recovering usable liquid from a drilling fluid circulating in a well bore and containing suspended solids and weighting material of greater density than the suspended solids comprising, centrifuging the circulated drilling fluid thereby separating the weighting material from the drilling fluid, centrifuging the effluent from the first mentioned centrifuging step so that the centrifugal force reacting against the suspended solids in the effluent is sufficient to separate therefrom a sufficient amount of such solids to produce a liquid effluent suitable for re-use in drilling fluids, and returning the last-mentioned effluent to the weighting material.

References Cited in the file of this patent

UNITED STATES PATENTS

| | | |
|---|---|---|
| 930,966 | Jahn | Aug. 10, 1909 |
| 1,871,284 | Ter Meer | Aug. 9, 1932 |
| 1,988,612 | Stindt | Jan. 22, 1935 |
| 2,156,333 | Cross et al. | May 2, 1939 |
| 2,688,405 | Sharples | Sept. 7, 1954 |

OTHER REFERENCES

Rogers: Composition and Properties of Oil Well Drilling Fluids, Gulf Publishing Company, Houston, Texas, 1948, pages 63 to 65 inclusive.